J. S. SEYMOUR.
WATER-COOLERS AND PURIFIERS.
No. 182,083. Patented Sept. 12, 1876.
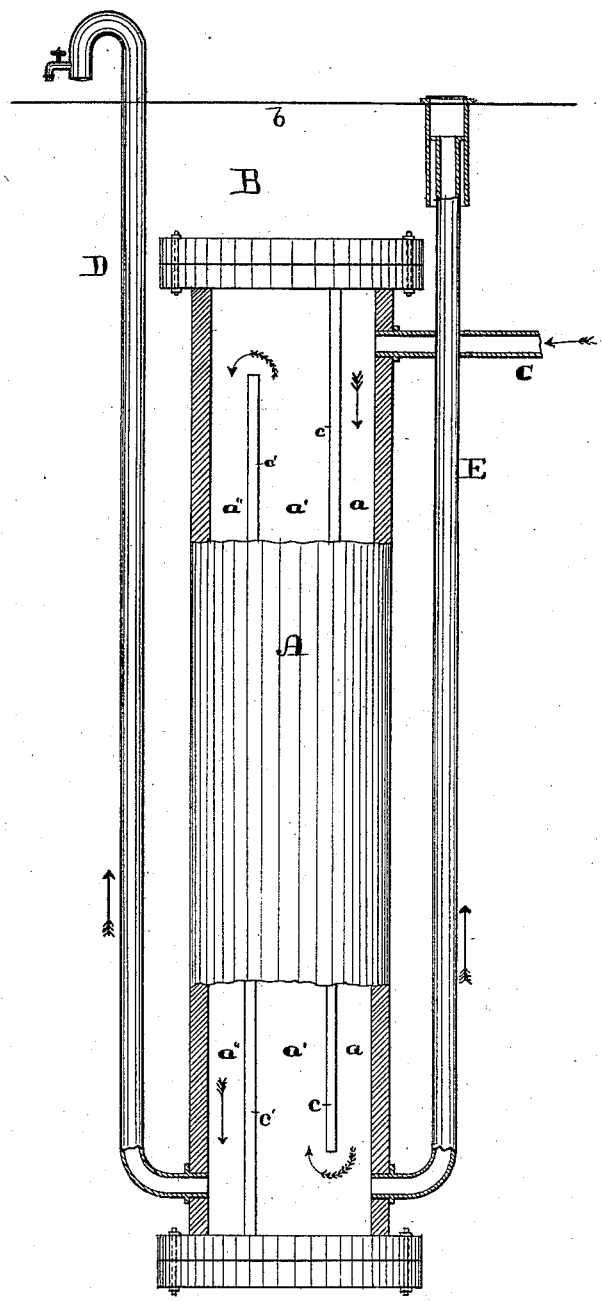
Witnesses.
Robt. S. Boyd
Fred. Langenbach
Inventor.
John S. Seymour,
By Chas. D. Moody
his atty

UNITED STATES PATENT OFFICE.

JOHN S. SEYMOUR, OF ST. LOUIS, MISSOURI.

IMPROVEMENT IN WATER COOLERS AND PURIFIERS.

Specification forming part of Letters Patent No. 182,083, dated September 12, 1876; application filed July 18, 1876.

*To all whom it may concern:*

Be it known that I, JOHN S. SEYMOUR, a resident of St. Louis, State of Missouri, have invented a new and useful Improvement in Water Coolers and Purifiers, of which the following is a full, clear, and exact description, reference being had to the annexed drawing, making part of this specification, in which the invention is shown in position.

A portion of the wall of the cylinder, both at the upper and lower ends thereof, is broken away to show the interior construction.

The aim of the invention is to provide means for economically cooling what is termed hydrant-water, or that water which is supplied through the pipes of a water-supply system of a city. It also relates to the provision for purifying the water.

Referring to the annexed drawing, A represents an inclosed vessel, preferably of a cylindrical form. It is arranged vertically, and, when in position, is placed down in the ground, and so as to bring the lower end thereof, say, twenty or twenty-five feet, and the upper end about two feet, from the surface $b$ of the ground B. I do not desire, however, in this respect to be confined to any particular position, it being the intention to locate the cylinder at a depth to enable it and its contents to be thoroughly cooled by the surrounding earth.

C represents a supply-pipe, through which water from the water-main (not shown) flows down into the cylinder. This pipe is made to enter the cylinder at the upper end thereof. D represents an exit-pipe, leading from the cylinder at the bottom thereof, upward to above the ground. The point of connection of this pipe with the cylinder is at the side opposite to that where the pipe C enters.

The cylinder is provided with two partitions, $c$ and $c'$, arranged vertically therein, and extending latterly across the cylinder, and as follows: One partition, $c$, beginning at the top of the cylinder, extends nearly to the bottom thereof, and the other partition, $c'$, beginning at the bottom of the cylinder, extends nearly to the top thereof. The partition $c$ is toward the supply-pipe C, and the partition $c'$ toward the exit-pipe D, and I, preferably, space the partitions apart, so as to include between them the larger portion of the cylinder.

E represents a pipe, leading from the cylinder, from the bottom thereof, and from that portion of the cylinder which is included between the partition $c'$ and the side where the supply-pipe C enters, upward to the surface of the ground. It can be closed by a suitable valve.

The operation of the invention is as follows: Water from the main flows through the pipe C into that part $a$ of the cylinder which is between the partition $c$ and the side where the pipe C enters. It thence flows upward through the space $a'$, between the partitions $c$ and $c'$. It thence flows downward through the space $a''$ on the exit side of the partition $c'$, and into the exit-pipe D, and thence through the pipe D to the surface of the ground, and as indicated by the arrows.

Now, by causing the water, after leaving the main, to flow downward into a reservoir which is located in the ground, as described, it is cooled down to the temperature of the surrounding ground, which, as shown in wells, is much lower than that of an ordinary street-main; and as no other agent for cooling is employed, the operation is an economical one. After the cylinder is once located in position no further means is needed.

The invention, as a cooler, is operative without employing the partitions $c$ and $c'$; but by means of the partitions the water is made to flow in an upward direction while passing through the cylinder. In this upward flow the water has opportunity for settling and becoming purer before being finally discharged. That part of the cylinder between the partition $c'$ and the side where the supply-pipe C enters, therefore, becomes a settling reservoir as well as a cooler. The sediment collects in the bottom of this portion of the cylinder, and when it is necessary to remove it the pipe E is brought into use—that is, the latter pipe is opened (and the pipe D preferably closed) and the water-current directed through it. In this way the cylinder can be flushed and cleaned.

I am aware, for the purpose of cooling it, that water has been conducted through pipes in the earth, and that a filtering device has been connected therewith. I do not, therefore, broadly lay claim to the cooling of water by causing it to flow downward into the ground, and a filter, even if new with me in this connection, would not answer my purpose; but

What I claim is—

The herein-described water cooler and settler, consisting of the cylinder A, partitions $c$ and $c'$, and pipes C, D, and E, substantially as described.

JNO. S. SEYMOUR.

Witnesses:
 THOS. L. JONES,
 CHAS. D. MOODY.